United States Patent
Desjardins et al.

(10) Patent No.: US 12,121,989 B2
(45) Date of Patent: Oct. 22, 2024

(54) METHOD OF FABRICATING A FIBRE-OPTIC PRESSURE AND TEMPERATURE SENSOR

(71) Applicant: UCL BUSINESS LTD, London (GB)

(72) Inventors: Adrien Desjardins, London (GB); Malcolm Finlay, London (GB); Charles Alexander Mosse, London (GB); Ioannis Papakonstantinou, London (GB); Radhika Poduval, London (GB)

(73) Assignee: UCL BUSINESS LTD, London (GB)

( * ) Notice: Subject to any disclaimer, the term of this patent is extended or adjusted under 35 U.S.C. 154(b) by 625 days.

(21) Appl. No.: 17/264,757

(22) PCT Filed: Jul. 31, 2019

(86) PCT No.: PCT/GB2019/052149
§ 371 (c)(1),
(2) Date: Jan. 29, 2021

(87) PCT Pub. No.: WO2020/025952
PCT Pub. Date: Feb. 6, 2020

(65) Prior Publication Data
US 2021/0299782 A1  Sep. 30, 2021

(30) Foreign Application Priority Data
Jul. 31, 2018 (GB) ..................... 1812464

(51) Int. Cl.
*B23K 26/00* (2014.01)
*B23K 26/0622* (2014.01)
*B23K 26/324* (2014.01)

(52) U.S. Cl.
CPC ...... *B23K 26/0006* (2013.01); *B23K 26/0624* (2015.10); *B23K 26/324* (2013.01)

(58) Field of Classification Search
CPC ............ B23K 26/0006; B23K 26/0624; B23K 26/324; G01L 9/0079; G01L 11/025;
(Continued)

(56) References Cited

U.S. PATENT DOCUMENTS

| 4,682,500 A | 7/1987 | Uda |
| 2011/0121414 A1 | 5/2011 | Rothacher |

(Continued)

FOREIGN PATENT DOCUMENTS

| CN | 206960027 U | * | 2/2018 | ............. G01L 1/242 |
| CN | 106996797 B | * | 7/2018 | ............. G01D 5/268 |

(Continued)

OTHER PUBLICATIONS

Hyungdae Bae et al. "Hybrid Miniature Fabry-Perot Sensor with Dual Optical Cavities for Simultaneous Pressure and Temperature Measurements", Journal Of Lightwave Technology, vol. 32, No. 8, Apr. 15, 2014, pp. 1585-1593.

(Continued)

*Primary Examiner* — Francis C Gray
(74) *Attorney, Agent, or Firm* — Harness, Dickey & Pierce, P.L.C.

(57) ABSTRACT

A method for making a housing that defines a cavity for a pressure sensor, the method comprising: providing a bulk of material that will form the housing; focusing a radiation beam on internal portions of the bulk of material so as to modify the internal portions, thereby defining the housing's shape, wherein upstream of the focus of the radiation beam other portions of the bulk material remain unmodified; and discarding either the modified portions or the unmodified portions of the bulk material so as to form the cavity.

22 Claims, 8 Drawing Sheets

(58) Field of Classification Search
CPC ..... G01L 1/242; G01L 9/0042; G01L 9/0045; G02B 5/284; B81C 1/00515
See application file for complete search history.

(56) References Cited

U.S. PATENT DOCUMENTS

| | | | | |
|---|---|---|---|---|
| 2012/0116255 | A1* | 5/2012 | Wang | B23K 26/361 156/60 |
| 2013/0083314 | A1* | 4/2013 | Lambourne | G01D 5/268 356/72 |

FOREIGN PATENT DOCUMENTS

| | | |
|---|---|---|
| WO | WO-2007-019676 A1 | 2/2007 |
| WO | WO-2011-008559 A1 | 1/2011 |
| WO | WO-2020149739 A1 * | 7/2020 |

OTHER PUBLICATIONS

G. C. Hill et al. "SU-8 MEMS Fabry-Perot pressure sensor", Sensors and Actuators A 138 (2007) 52-62, pp. 52-62.
Cyril Hnatovsky et al. "Fabrication of Microchannels in Glass Using Focused Femtosecond Laser Radiation and Selective Chemical Etching", Applied Physics A 84, 47-61 (Jul. 2006).
Andrey Vyatskikh et al. "Additive manufacturing of 3D nano-architected metals" Nature Communications Article (2018) pp. 1-8.
Search Report for British Application No. GB1812464.4, mailed Jan. 30, 2019.
International Search Report and Written Opinion of the International Searching Authority issued in PCT/GB2019/052149, mailed Oct. 28, 2019; ISA/EP.
Melissinaki et al., "A Fiber-Endface, Fabry-Perot Vapor Microsensor Fabricated by Multiphoton Polymerization," in IEEE Journal of Selected Topics in Quantum Electronics, vol. 21, No. 4, pp. 344-353, Jul.-Aug. 2015, doi: 10.1109/JSTQE.2014.2381463.

* cited by examiner

METHOD OF FABRICATING A FIBRE-OPTIC PRESSURE AND TEMPERATURE SENSOR

CROSS REFERENCE TO RELATED APPLICATIONS

This application is a U.S. National Phase Application under 35 U.S.C. 371 of International Application No. PCT/GB2019/052149 filed on Jul. 31, 2019 which claims the benefit of priority from Great Britain Patent Application No. 1812464.4 filed on Jul. 31, 2018. The entire disclosures of all of the above applications are incorporated herein by reference.

FIELD OF INVENTION

The present application relates to methods for fabricating miniature fibre optic sensors to measure pressure and temperature, for instance in a physiological environment such as a blood vessel of a human or animal subject.

BACKGROUND

Invasive measurements of pressure and temperature can be invaluable to guide minimally invasive procedures for diagnosis and therapy. For instance, blood pressure measurements performed across a stenosis in a coronary artery are used to assess whether stent placements are required; temperature measurements can be used to provide information to calculate flow via thermodilution and to detect vulnerable plaque. High frequency pressure measurements (typically 100 kHz to 100 MHz) are also used to receive ultrasound waves, to perform ultrasound imaging or to localise medical devices in the body with ultrasonic tracking. These sensors could also be applied to non-medical sensor applications, including monitoring power plants, internal combustion engines, and petroleum well monitoring.

Methods for fabricating pressure and temperature sensors that can be integrated into invasive medical devices and guidewires, and for interrogating them, are known to the art. Fibre optic sensors are often favourable for medical applications as they can be highly accurate, immune to electromagnetic interference, and MRI compatible. Fibre optics used for telecommunications have miniature lateral profiles (cladding diameters of 80 or 125 microns are typical) and mechanical flexibility that lend themselves well to integration within invasive medical devices.

In general, a fibre-optic sensor can involve extrinsic or intrinsic sensing elements, or a combination thereof. An extrinsic sensing element is a structure external to an optical fibre, which is interrogated by light from the optical fibre. A prominent example is a Fabry-Perot cavity, in which light from the optical fibre undergoes multiple reflections. The reflection spectra of Fabry-Perot cavities can change in response to temperature and pressure on the cavity. Intrinsic sensing elements are within the optical fibre itself. A prominent example of this is a Fibre Bragg grating, in which refractive index variations induced in the optical fibre yield reflection spectra that change in response to changes in temperature and strain of the fibre.

Extrinsic sensor elements can include a diaphragm that deflects in response to changes in external pressure, which is attached to a support structure bonded to an optical fibre. In sensor geometries known to the art there can be a sealed gas cavity between the diaphragm and the optical fibre. In a typical high-finesse configuration, there are two surfaces with high optical reflectivity that bracket the cavity, for instance the end face of the optical fibre and the inner surface of the diaphragm. This configuration is known as a Fabry-Perot cavity. In a low-finesse cavity, there are two or more surfaces with lower optical reflectivity (typically less than 10%). Methods for interrogating high- and low-finesse cavities, for instance by using incident narrowband or broadband light and different methods for receiving reflected light, and for producing calibrated pressure signals, are known to the art. "Hybrid Miniature Fabry-Perot Sensor with Dual Optical Cavities for Simultaneous Pressure and Temperature Measurements" by Bae et al., Journal of Lightwave Technology volume 32 number 8, 15 Apr. 2014 and "SU-8 MEMS Fabry-Perot pressure sensor" by Hill et al., Sensors and Actuators A 138 (2007) 52-62 disclose methods for fabricating fibre optic sensors.

Whilst several methods for fabricating fibre optic sensors that provide pressure, temperature, or a combination of pressure and temperature have been developed, they have prominent limitations: they tend to be very expensive in terms of fabrication time and capital equipment required, or they tend to yield sensors that do not measure pressure or temperature simultaneously, or they tend to yield sensors with inadequate performance for clinical applications. For instance, extrinsic pressure sensors can be fabricated by anodic bonding of a silicon diaphragm onto a glass support structure, but this process tends to be very expensive in terms of assembly time and the capital equipment required. One of the reasons for the difficulties of producing fibre-optic pressure sensors for physiological applications is the high dimensional tolerances that are required, which are typically at the micron-scale. In particular, these dimensional tolerances are often applicable to the thicknesses of diaphragms, particularly when the diaphragms are fabricated with rigid materials such as silica. They can also be applicable to interfaces with optical fibres, which are typically fabricated with micron or sub-micron-scale dimensional tolerances. As such, it can be challenging to fabricate the diaphragms and/or to apply them to support structures. There is a need to develop new fabrication methods that yield high performance sensors with significantly lower costs, and which can yield sensors for measuring pressure and temperature simultaneously.

SUMMARY

The invention is defined in the appended claims.

A unique methodology and class of designs is described herein to fabricate free-form sensor elements for optical fibres; ranging from simple standalone single-element sensors with confined cavities and lensed elements, to multi-element multi-modality miniature fibre-optic sensors for myriad applications.

Microfabrication methods for fabricating pressure and temperature fibre optic sensors using optical microfabrication techniques are provided.

In one class of microfabrication methods, femtosecond laser-assisted etching (FLAE) is used to modify a first material and subsequently, etching is performed to remove regions with modified material. Etching is typically performed chemically with diluted hydrofluoric (HF) acid solution (typically 5-10% in water) or with an alkaline such as potassium hydroxide (KOH). Typically, here, a region where modified material is removed is used as an optical cavity through which interrogation light from an optical fibre is directed. This region is sealed as part of the sensor fabrication process so that said optical cavity is isolated in pressure from the external environment. This class of methods can be used to create both extrinsic and intrinsic sensing elements, or a combination thereof. A diaphragm that deflects in response to external pressure changes can be formed either with an un-modified region of the first material, or with a second material that is deposited onto an area of the modified region prior to etching.

In another class of microfabrication methods, non-linear photon absorption is used for localised modification of the chemical composition of a photosensitive material, also known as a photoresist, to fabricate an extrinsic element from the said material; after excitation, non-modified regions are selectively removed by rinsing (for instance, with alkaline solutions), in a process known as "development" in photolithography terminology. In one class of photoresists known as "negative tone," illuminated areas crosslink and become less soluble to the developer than non-illuminated areas. In a second class of photoresists known as "positive tone," illuminated areas are chemically modified and become more soluble to the developer compared to the non-illuminated areas. Typical solutions for development include potassium hydroxide (KOH), sodium hydroxide (NaOH), tetramethylammonium hydroxide (TMAH) or other alkaline solutions usually diluted in water. Low vapour pressure organic solvents like N-Methyl-2-pyrrolidone (NMP), Propylene glycol methyl ether acetate (PGMEA) and other are also appropriate for development when materials that corrode in alkaline solutions are being used. A diaphragm that deflects in response to external pressure changes can be formed either with a cured region of the first material, or with a second material that is deposited onto an uncured region prior to rinsing. An optical cavity adjacent to the diaphragm, which is interrogated from light from an optical fibre, is sealed as part of the sensor fabrication process so that said optical cavity is isolated in pressure from the external environment.

With both class of methods, mirror coatings can be applied to increase reflectivity for optical isolation so that interrogation light does not disturb the external environment, and temperature sensitivity can be conferred with sensor components that are illuminated by interrogation light.

BRIEF DESCRIPTION OF THE DRAWINGS

Various implementations of the invention will now be described in detail by way of example only with reference to the following drawings.

DETAILED DESCRIPTION

Figure 1:
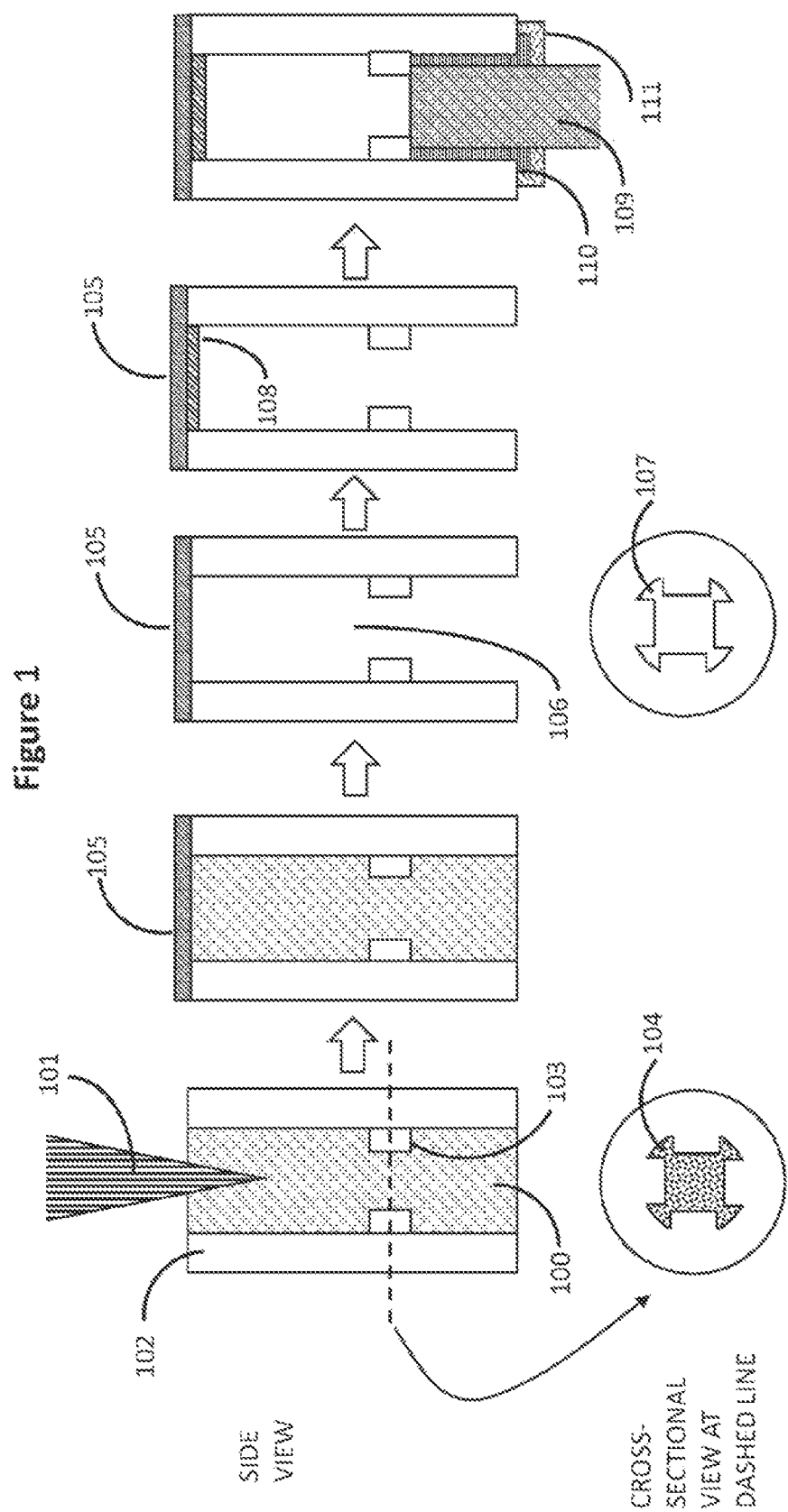
FIGS. 1 to 3 illustrate stages in the manufacture of a pressure sensor according to arrangements of the present invention.

Described herein are methods for fabricating fibre-optic sensors to measure pressure and temperature. As an example of their usage, these sensors may be used to obtain pressure measurements inside a blood vessel to guide stent placement, or to measure intracranial pressure. In general, the described fabrication methods are particularly suited to applications where small sensor dimensions are of utmost importance, for instance in monitoring physiological parameters to facilitate clinical diagnosis and therapy, and to monitor pressure in oil and gas wells.

A sensor fabricated by the described methods typically has a diaphragm adjacent to a sealed gas cavity that deforms with changes in external pressure. The extent of the deformation depends on several factors such as the diaphragm thickness, the diaphragm geometry, and the mechanical properties of the diaphragm material. For instance, reducing the thickness and elastic modulus of the diaphragm tends to increase diaphragm deformation.

The sensor diaphragm is illuminated by interrogation light provided by the optical fibre; deformations result in changes to the reflection properties of interrogation light (for instance, its wavelength-dependent reflectivity), which are detected by an external console. The sensor typically comprises an optical cavity that brackets the sealed gas cavity. This optical cavity can include a high-finesse Fabry-Perot optical cavity, in which there are two mirrors with high optical reflectivity (typically greater than 70%), or a low-finesse cavity in which there are two or more reflective surfaces with low optical reflectivity (typically less than 10%), or a combination thereof. Methods for interrogating low- and high-finesse Fabry-Perot cavities, for instance with broadband or wavelength-swept interrogation light sources, and for processing detected changes to the reflectivity of interrogation light to measurements of external pressure, are known to the art.

A first class of the described fabrication methods involves creating a gas cavity with femtosecond laser-assisted etching of a transparent material. This transparent material may be a glass such as quartz silica glass or borosilicate glass, or it may be crystals such as sapphire and yttrium aluminium garnet (YAG). Pulsed laser light, with pulse durations typically less than 1000 fs and greater than 1 fs, is tightly focused to a transparent first material (typically with a microscope objective). At the focus, the high photon flux results in highly localised modifications to the first material and importantly, these modified regions can be etched away significantly more quickly than the regions that have not undergone modification. The etching process can result in a cavity that can subsequently be sealed to gas and fluids. With this method, a diaphragm can be created with un-modified regions of the first material. In a preferred embodiment, this first material is fused silica, which is not photosensitive. The glass may also be a photosensitive glass such as Foturan; in this case, etching can be followed by post-thermal treatment to increase surface smoothness.

A diaphragm can also be created with a second material that is deposited onto a modified region of the first material, prior to etching. This deposition process can be performed with methods known to the art including chemical vapour deposition (CVD), atomic layer deposition (ALD), and physical vapour deposition (PVD). The etching step removes the modified region of the first material, leaving behind the diaphragm. A key advantage of this class of fabrication methods is that glass and other transparent non-polymeric materials that have low water and gas permeation, high structural rigidity, and low thermal expansion coefficients (relative to some polymers) can be used for sensor construction.

Femtosecond laser modification allows for extrinsic structures to have a wide range of geometries and thereby to optimise the sensors for different applications. For instance, the extrinsic glass structures can have a narrow aperture to secure the fibre, and a widening of the cross-sectional diameter toward the distal end of the sensor, where the diaphragm is positioned. This arrangement could allow for the diaphragm to be significantly larger than the diameter of the optical fibre, for instance.

Femtosecond laser modification enables precise fabrication of optical elements to provide sensor functionality that extends beyond pressure sensing. For instance, it can be used to create lenses within or proximal to the optical cavity to focus interrogation light and thereby to increase the confinement of interrogation light. It can also be used to create structures such as optical windows that can be used to obtain temperature measurements, for instance with low-coherence interferometric phase resolved detection. It can be combined with femtosecond laser drilling.

Femtosecond laser modification may be performed more than once to fabricate the sensor. For instance, it may be formed once to define a first geometry for the extrinsic structure, which can include a region for a diaphragm that is recessed from the distal end, or which is curved; following etching, femtosecond laser modification may be performed again, which may be followed by deposition of the second material for diaphragm formation, and second etching step to remove modified material adjacent to the diaphragm.

The optical fibre may have microfabricated components connected to it before it is bonded to a microfabricated extrinsic structure. These components can include polymer domes and glass components microfabricated with femtosecond laser modification. The use of polymers with high linear expansion coefficients, such as polydimethylsiloxane, within the sensor can be useful to achieve measurements of temperature changes with high sensitivity.

A second class of the described sensor fabrication methods involves defining the geometry of an extrinsic structure with a sealed gas cavity using a positive or negative photoresist, in which a light-sensitive material is modified using non-linear optical absorption with a focused beam, wherein upstream of the focus of the radiation beam, other portions of this material remain unmodified. This includes mechanisms known to the art, such as multi-photon absorption, ultralow one photon absorption, stimulated emission depleted direct laser writing, saturable absorption, reverse saturable absorption, among others. Two-photon excitation, a sub-class of multi-photon absorption is prominent among these and typically involves a beam that is tightly focused and has a short pulse durations (typically femtosecond-scale), in which two incident photons (each typically in the infrared range) of comparably lower photon energy than needed for one photon absorption are absorbed in one quantum event. The material is substantially transparent at wavelengths of individual incident photons, and absorbing in the wavelength range corresponding to the total energy of two incident photons. Two-photon absorption is a non-linear process that scales with the square of the incident light intensity, thereby photoresist modification occurs only in a very tightly-confined region within the material around the focal point of the incident beam. Due to the requirement of high flux of incident photons, this two-photon absorption process occurs in very tightly-confined regions within the material (typically sub-micron in dimensions). This technique allows for printing at sub-micron resolution, which also makes it suitable to directly create textured diaphragm surfaces for further functionalisation to form plasmonic sensors for instance. Multi-photon, and one-photon based non-linear absorption processes are possible too and known to the art.

With a negative photoresist, non-linear absorption leads to curing of the material; by varying the location of the focus of excitation light within the material and tracing predefined trajectories with algorithms known to the art, confined curing over ultrasmall voxels can be controlled in three dimensions. Following optically curing using non-linear absorption, uncured material is rinsed out (for instance, using materials known to the art such as PGMEA or SU-8 developer), leaving behind a structure that can be used to fabricate an extrinsic sensing element. After rinsing, further processing steps can include exposure to UV light (for instance with a UV oven) and/or post-baking (e.g. at 120° C. for 90 minutes) to enhance crosslinking density and improve material properties (for instance, to increase material stiffness or enhance surface smoothness). With a positive photoresist, non-linear excitation of a material is used to modify regions of a material in 3D and subsequently these optically modified regions are washed away (for instance, using solutions such as Novo developer 591S, PGMEA, and AR 300-XX). Two-photon microfabrication of external structures are typically guided by software that automatically varies the location of excitation light based on provided designs. Photoresist materials known to the art include SU-8, IP-S, IP-Dip, Ormocere, AZ 125nXT (negative photoresists), AZ MIR 701, AZ 9260, AZ 40XT (positive photoresists), amongst others. The photoresist can comprise metallic nanoparticles, and heating can be performed to remove polymeric components, as disclosed in Vyatskikh et al. Nat. Communications (2018)9: 593.

The extrinsic structure fabricated with a nonlinear optical lithography process (for instance, two-photon absorption) can be bonded to an optical fibre using a flowable adhesive such as UV-curable epoxies such as Norland 81, cyanoacrylates, ceramic adhesives, heat curing epoxies, positive photoresists, or polymer material used for the microfabrication itself. The geometry of the structure and its cavity can be arranged such that bonding of the extrinsic structure to the optical fibre results in gas sealing of the cavity. Alternatively, the extrinsic structure may include one or more vent holes to allow for material washout and these vent holes may be subsequently sealed.

Before or after bonding of the extrinsic structure to the optical fibre, a mirror coating (metallic or polymeric) may be applied to the inner or outer surface of the diaphragm to increase its reflectivity to interrogation light and thereby to improve the signal-to-noise ratio of the sensor signal. In a preferred embodiment, this mirror is formed by evaporation of metals such as gold. Subsequently, a protective coating may be applied to a part of the distal end of the sensor (for instance to prevent water ingress into a flowable adhesive) or to the entire distal end of the sensor (for instance with a conformal coating such as parylene).

The optical fibre is typically single-mode with a silica core, with a distal end that is cleaved at normal incidence. Alternatively, it can be a double clad fibre to allow for interrogation light to propagate in the core and for additional light used for effecting other types of sensing functionality can be delivered in the multimode inner cladding. Alternatively, it could be a single-mode fibre with an air core or a multimode or multi-core fibre or a polymer fibre.

The microfabricated extrinsic structures are typically detached from the flat substrate and integrated with the optical fibre. The integration can be performed manually under an optical microscope using a three-axis stage for alignment or automatically using appropriate autofocussing and alignment instrumentation. The elements can be securely integrated by using adhesive materials for instance Norland 81, cyanoacrylates, heat curing epoxies, or even positive photoresists or the starting polymer material used for the microfabrication itself. Following complete integration of the optical fibre to the sensor element or printed sensor sub-structure, addition of further design elements can be performed over the initially-integrated optical fibre structure.

In a preferred embodiment, the microfabricated sensor comprises a polymer dome that is insensitive to external pressure changes and sensitive to changes in ambient temperature, and transparent to the interrogation wavelength. This dome is arranged symmetrically with respect to the optical fibre axis and proximal to the diaphragm. Reflections of interrogation light from the polymer dome and from the diaphragm are resolved with phase-resolved low coherence interferometry based on differences in the phases of the interferogram frequency components. With this embodiment, measured changes in dimension of the polymer dome are used to obtain measurements of temperature changes; measured deformations of the diaphragm are used to obtain measurements of pressure changes. The polymer dome can comprise through-holes to allow for removal of the etchant. The polymer dome and the diaphragm can both be fabricated with a single material using multi-photon printing microfabrication, although the polymer and diaphragm can also be fabricated with different materials.

It can be advantageous to guide interrogation light within the extrinsic structure by lensing it or by redirecting it to different locations. One advantage of a lens is that it can collimate or focus the interrogation light to reduce beam walk-off. Additionally, it the beam exiting the optical fibre core (single mode optical fibre in this instance) is prone to divergence. Partially reflective surfaces, which can be achieved using angled structures fabricated with non-linear polymerisation, can redirect portions of the interrogation light at different diaphragms that are oriented differently with respect to each other. Said angled structures can also be curved and can have partially reflective coatings applied. Design optimisation of these elements can be performed using optical design software known to the art.

It can be useful to increase the optical reflectivity within the extrinsic structure, for instance to increase the intensity of interrogation light back-coupled into the fibre and to optically isolate the sensor from its environment. In preferred embodiments, reflective coatings are applied to the inner or outer surfaces of the diaphragm. These coatings can be applied with methods such as metal sputtering, evaporation, PVD, CVD, ALD, among others.

The sensing functionality of the distal diaphragm could be extended beyond pressure and temperature by including nanostructuring along with functional coatings. For instance, a functional metallic coating in conjunction with nanostructuring the outer/distal surface of the diaphragm (away from the confined cavity) could be used to design a plasmonic sensor. Design optimisation for the geometry and materials used for the plasmonic sensing can be achieved through optical simulation methods such as finite difference time domain, finite element methods, ray tracing, rigorous coupled wave analysis, among others.

The present invention makes use of the advancement of optical microfabrication techniques. With these techniques, three-dimensional structures can be created using materials that are modified in three dimensions with focused light beams. By moving the position of the focus relative to a material, structures with complex three-dimensional geometries can be fabricated. In one example, femotosecond (fs) laser-assisted micromachining is used to modify the material, due to non-linear interactions between the light and the material that are enabled with the brief pulse durations and tight spatial confinement of the beam. These modifications can include nanocracks and disordered nanostructures, as reported [Appl. Phys. A 84, 47-61 (2006)]. Subsequently the modified regions are etched away, resulting in a structure fabricated through subtractive microfabrication. In another example, two-photon excitation is used to cure a light-sensitive resin material at specific locations; subsequently, non-illuminated/uncured regions are washed away in the developer solvent, whereby the resulting structure is realised through additive microfabrication.

In a preferred embodiment illustrated in FIG. 1, an extrinsic glass structure with a cylindrical geometry is defined with modifications 100 to the central region around the longitudinal axis performed with femtosecond laser assisted etching (FLAE). These modifications are performed with a tightly focused femtosecond laser beam 101. In this embodiment, the outer regions of the housing 102 and a ridge 103 are unmodified. In the cross-sectional view of FIG. 1, it can be seen that the ridge 103 comprises regions that extend closer to the housing wall, such as the one indicated 104. Silicon nitride is deposited with CVD onto the distal end to form a layer 105 that spans both modified and unmodified regions of the glass. Alternative coating materials include titanium dioxide and other metal oxides or metal coatings that can be deposited through CVD. Subsequently the modified regions are chemically etched away with dilute HF acid, leaving behind a cavity 106, transforming the silicon nitride layer 105 into a diaphragm, and transforming regions that extend closer to the housing wall into gaps in the ridge such as the one indicated 107. A mirror coating 108 is then applied to the inside surface of the diaphragm. After etching, an optical fibre 109 with a silica core and silica cladding is inserted into the extrinsic glass structure and fusion splicing (welding) with an electric arc or laser welding is performed to secure it to the ridge 103. Gaps 107 in the cylindrical ridge allow for hot gases to escape from the cavity during splicing or laser welding without exerting undue pressure on the diaphragm. After bonding, the vent hole is sealed with a flowable adhesive 110. This adhesive can include cyanoacrylate or epoxy, amongst others; heating or UV can be applied to improve their material properties. An overcoat material 111 such as silicone is applied to reduce permeation of gas and fluids into the sealant. In other embodiments, a conformal coating such as parylene can be applied before or after sealing.

Figure 2:
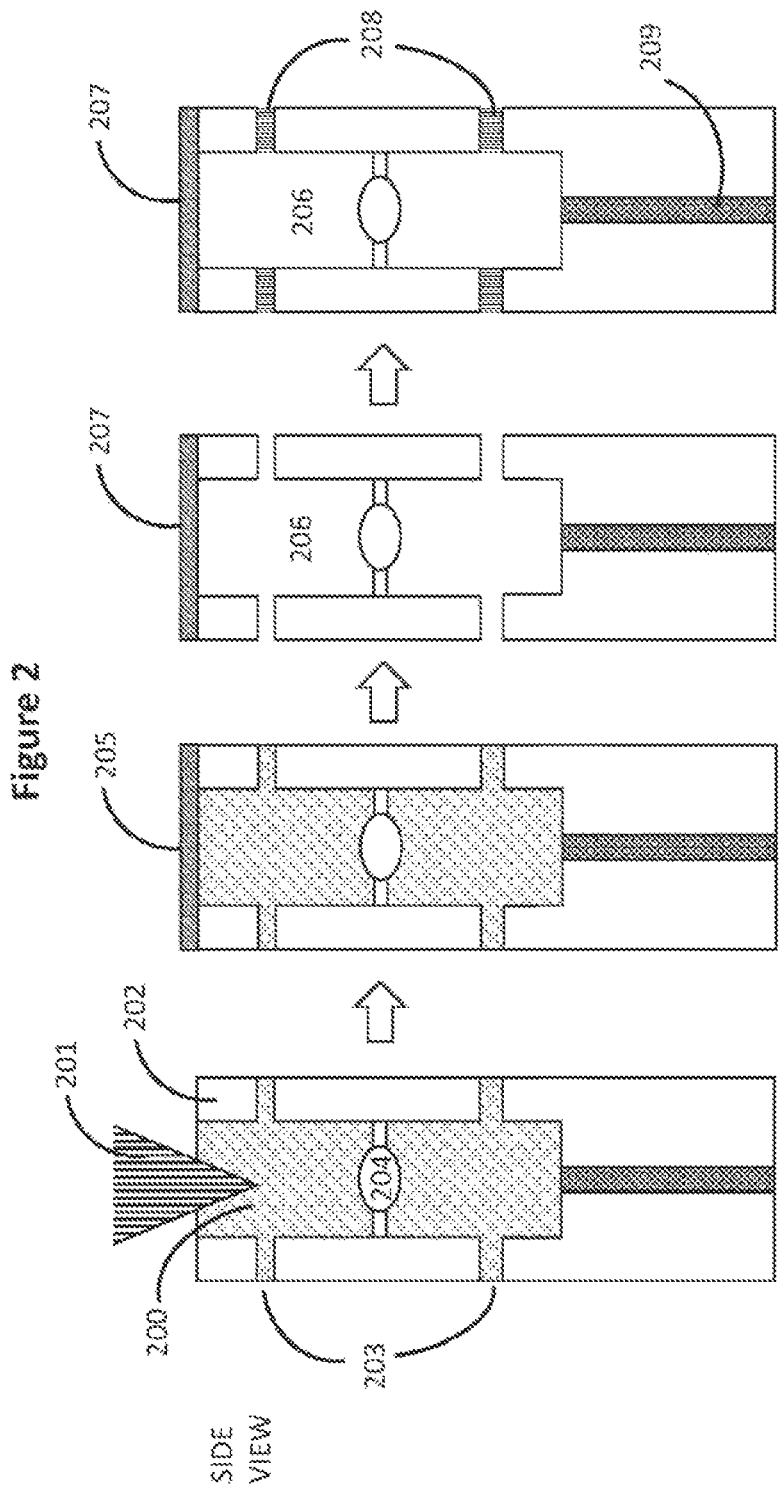

With this class of fabrication methods, the first material can be within the optical fibre itself, as illustrated in FIG. 2, so that femtosecond laser modification is used to modify regions that extend across the core and cladding of the optical fibre. In a preferred embodiment, the modified region 200 created with the tightly focused femtosecond beam 201 extends within a region of the fibre that is primarily central relative to the fibre axis and extends to the distal end of the optical fibre 202. It extends to the lateral sides of the fibre at several locations 203 that will become through holes after etching to allow for an etchant to progress from outside to inside the optical fibre. A lens 204 supported by tethers are also created with femtosecond laser modification. A silicon nitride layer 205 is applied at the distal end of the optical fibre with CVD. Etching results in a cavity 206 transforms this silicon nitride layer 205 into a diaphragm 207 that is supported on the sides. A sealant 208 is applied to the through-holes, which seals the cavity 206 to gas and fluids. In preferred embodiments, this sealant is a UV-curable flowable adhesive. The lens focuses light transmitted by the optical fibre core 209 onto the diaphragm 207.

Figure 3:
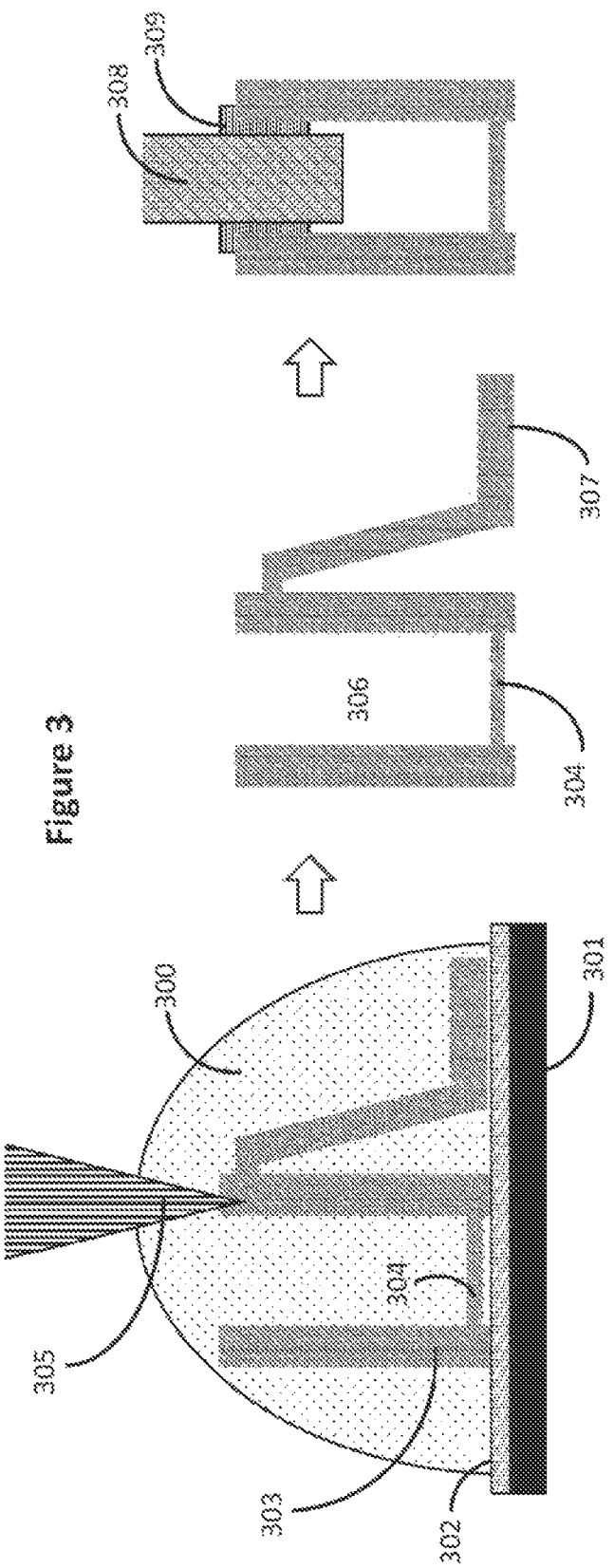

FIG. 3 shows a schematic overview of sensor fabrication and integration to an optical fibre. In an embodiment using positive tone photoresist, a droplet of the photosensitive polymer 300 is drop-casted onto a flat substrate 301 coated with a sacrificial layer for instance Indium Tin Oxide (ITO) 302, and cured with submicron resolution to fabricate the extrinsic sensor element 303 that comprises a diaphragm 304, using a tightly focused femtosecond laser beam 305 through two photon polymerisation (or another nonlinear photo-curing process). Afterwards, there is immersion in developer solvent such as PGMEA to remove the uncured polymer regions followed by detachment from the substrate 301 through removal of sacrificial ITO coating 302 by dissolution in an HCl bath. The developed and detached structure with its is then integrated with its diaphragm 304 adjacent to the cavity 306 created by immersion in developer solvent is manipulated with the support segment 307 under an optical microscope and secured to an optical fibre 308 using a very small quantity of flowable adhesive 309. Following the integration and securing step, the printed support structure 307 is removed from the extrinsic sensor element 303 by snapping it off at its narrowest point, for instance using a fine tweezer, to form an almost circularly symmetric sensor element.

Figure 4:
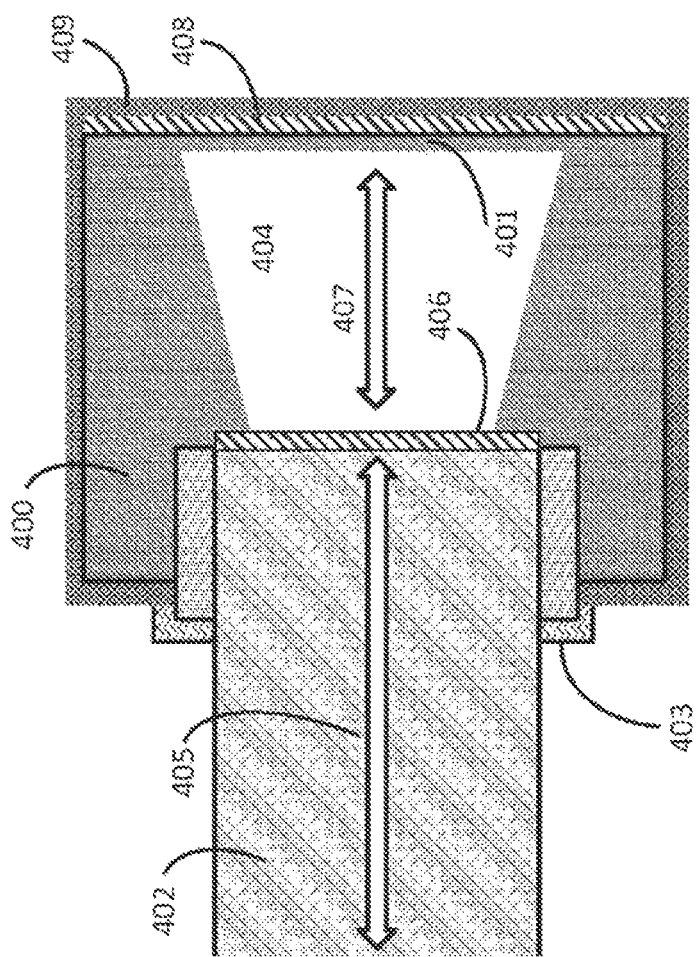
FIGS. 4 to 8 illustrate alternative arrangements of a pressure sensor according to the present invention.

FIG. 4 shows an embodiment of the invention in which the extrinsic structure 400 comprises a diaphragm 401 (whose geometry can be readily tailored to design) which is bonded to an optical fibre 402 using an adhesive 403 forming an enclosed cavity 404. This adhesive could include a UV-curable epoxy or cyanoacrylate or photoresist or a silicone adhesive, for instance. Pressure sensitivity of the distal deformable diaphragm chiefly depends on the material properties (Young's modulus and mechanical response to pressure and temperature) and the diaphragm geometry, i.e. thickness and area (diameter in case of circular diaphragm, which is the preferred shape). Preferably, the optical fibre is a single-mode optical fibre which has a typical core diameter in the range of 3 to 15 microns and a typical cladding diameter in the range of 50 to 125 microns. Preferably, the optical fibre has a cleaved end face, and in FIG. 4 it is shown with a fibre cleaved at normal incidence (0 degrees), although it could be cleaved at a slight angle (typically less than 8 degrees) to reduce back-reflection of interrogation light. Interrogation light 405 transmitted by the core of the optical fibre partially reflects from a mirrored surface 406 at the distal end of the optical fibre; a portion 407 is transmitted and reflects from the diaphragm and its mirror coating 408. The extrinsic structure is coated with a protective coating 409, to shield against moisture ingress or corrosive agents. In this embodiment, the extrinsic structure has a mirror coating 408 applied to the outer surface of the diaphragm 401. This mirror coating could also be applied to the inner surface of the diaphragm 401 (when coating is applied prior to sensor-element integration to the optical fibre). Furthermore, the cleaved surface of the optical fiber itself could be coated with a partially reflective mirror coating to form high-finesse cavities that can be interrogated using optical interferometry methods known to the art. Each of the mirror coatings could be a metallic coating or a dielectric coating (dielectric stacks or alternating birefringent layers), for instance; it could be applied by processes known to the art such as evaporation, sputtering, electroplating, dip coating, specialized spin coating, among others. In other embodiments, there could be reflective components within the first material of the extrinsic structure. The protective coating could be parylene or another polymer applied with conformal coating techniques known to the art. The protective coating 409 can also extend across the adhesive 403 and onto the optical fibre 402, thereby reducing permeability to moisture or gas and conferring biocompatibility. In this embodiment, interrogation light 405 that is transmitted to the extrinsic structure via the optical fibre undergoes reflection at the optical fibre end face and at the inner surface of the diaphragm. Interference between light reflected from the reflective surface 406 at the distal end of the optical fibre and the reflective surface 408 on the diaphragm are detected by a console (not shown). The sensor elements are generally all non-magnetic, when non-metallic materials are used in the reflective coatings 408, in which case they can be readily included in environments with fluctuating magnetic fields, for instance in a clinical setting involving active use of MRI equipment.

Figure 5:
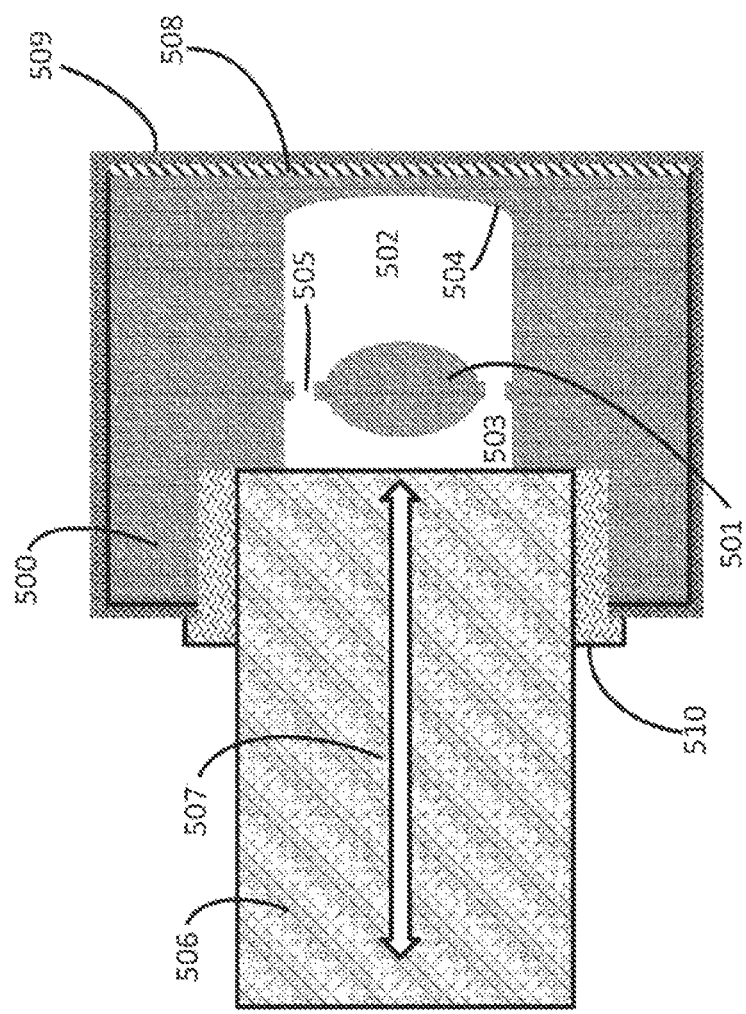

FIG. 5 shows a sensor similar to the embodiment in FIG. 4 except that the extrinsic structure 500 comprises an integrally formed lens element 501 that extends across a cross-section of the cavity 502. Compared to the diaphragm 504 positioned at the distal end of the sensor which deforms with changes in temperature and external pressure, the lens element is insensitive to physiological pressure changes due to its high bulk modulus. The lens element does change dimension in response to changes in temperature; reflections from each surface that can be detected interferometrically, for instance with phase-resolved low coherence interferometry, can be used to measure changes in temperature. The lens element 501 serves to focus interrogation light onto a surface of the deformable diaphragm and thereby to increase the intensity of light reflected from the diaphragm into the optical fibre. In this embodiment, the diaphragm has a variable thickness: the outer region 504 has a greater thickness than the inner region. There is at least one hole 505 in the tether of the lens element to allow for the uncured starting material to be removed from the cavity space 502 prior to the integration of the optical fibre 506 that transmits interrogation light 507, when the design is realised using a negative photoresist though an additive photo-polymerisation process. Preferably, this hole is not in the path of the interrogation beam. An additional cavity region 503 is created following fiber integration to the printed structure 500. An equivalent design can also be realised using a subtractive process using positive photoresists or glass. The diaphragm can comprise a reflective layer 508 and a protective layer 509. The optical fibre 506 can be secured to the external cavity structure 500 with a flowable adhesive 510.

Figure 6:
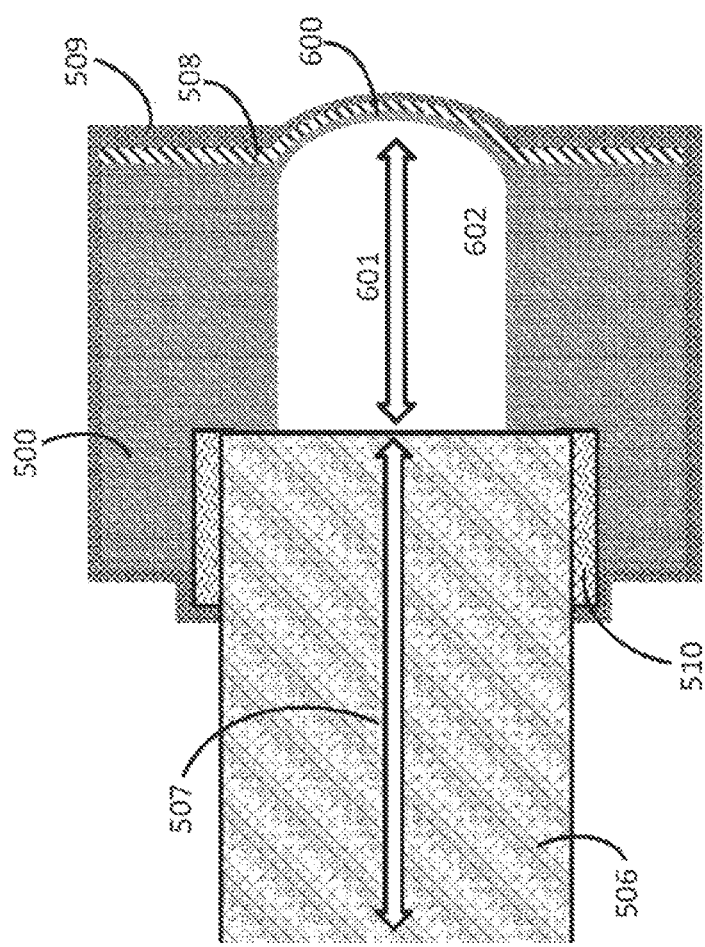

FIG. 6 shows a sensor which is a modification of the embodiment in FIG. 5, where the diaphragm 600 is curved so that it is concave for interrogation light 601 incident from the optical fiber 506. The interrogation light 601 is transmitted from the optical fibre and traverses the cavity 602 and is focused back at the optical fiber core area on its cleaved endface for improved signal in the sensor interrogation setup. Given the capability of printing microscale freeform structures using additive and subtractive techniques involving multi-photon polymerisation having resolution of <200 nm, the lensing geometry in this design is not subject to the constraints of conventional micro-optics fabrication where spherical geometries tend to be favoured.

Figure 7:
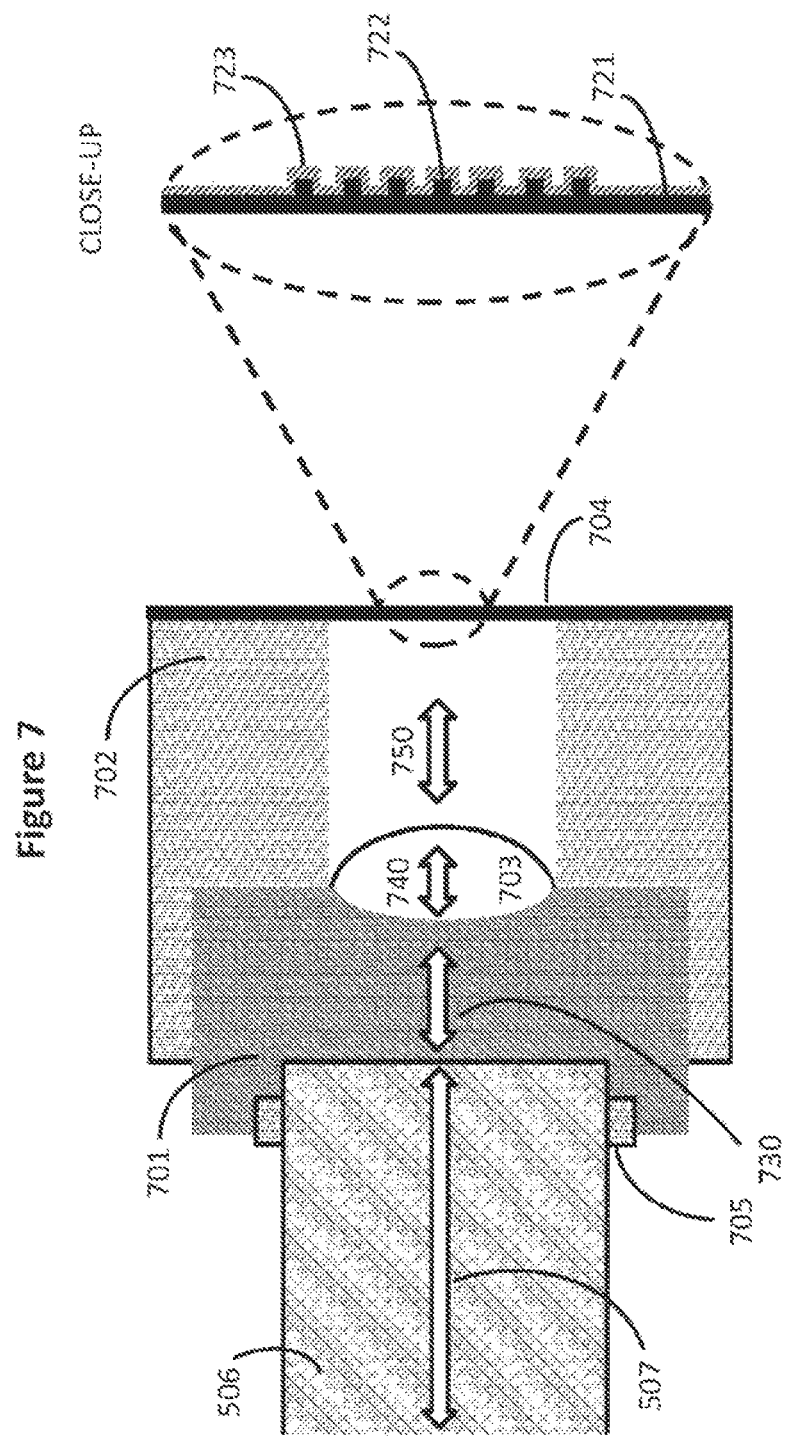

FIG. 7 shows an embodiment in which the sensor comprises a multi-part structure composed of different materials (701, 702, 703, and 704) which could be materials including but not limited to silicones, epoxies, acrylics and optically transparent resins. Intermediate optical elements 703 can be incorporated, which could be either microfabricated (for instance with FLAE), or fabricated through drop-casting of optically transparent polymer/resin into a microfabricated reservoir. This embodiment can provide design modularity whilst allowing use of materials that have higher thermal expansion coefficients or have high optical quality due to the surfaces formed by drop-casting. The materials that could be used for such droplet fabrication include silicones, epoxy, PMMA and acrylics. The integration to the fibre in a similar manner as detailed for the embodiment in FIG. 3. One or more parts of this hybrid design can be fabricated using a multi-photon polymerisation method, for integration onto an optical fibre, aiding modular design. The multiple parts 701, 702, 703 and 704 can be integrated using an optical adhesive 705 or plasma-based bonding or Van-der Waals forces, for example in case the modular segments that are uniform metallic or dielectric coatings forming the distal pressure sensitive diaphragm. Depending on the dimensions, refractive indices and surface properties of each of these layers, reflections from one or both of the surfaces of each of these layers could be resolved in the optical interrogation setup. The diaphragm element represented as flat in this embodiments, can be curved inward or outward in other embodiments. The deformable diaphragm can have micron-scale or nano-scale variations 722 on its distal surface 721. In one case, the texturing on the diaphragm outer surface could be an array of pillars 400 nm in diameter and height with 1 μm pitch followed by coating with gold nanoparticles 723 for plasmonic sensing. In other embodiments, textures include periodic and quasi-periodic structures, diffraction gratings, among other which can be functionalised with metallic nanoparticles for waveguiding or plasmonic sensing. These textures, with interrogation schemes known to the art allow for information complementary to pressure and temperature to be obtained. The complete hybrid structure following fibre integration can be further mechanically strengthened and secured by conformally coating with 1-3 μm thick layer of parylene or other such coatings suited to atomic layer deposition. Interrogation light transmitted and reflected from the interfaces of different parts is indicated schematically as 730, 740, and 750.

Figure 8:
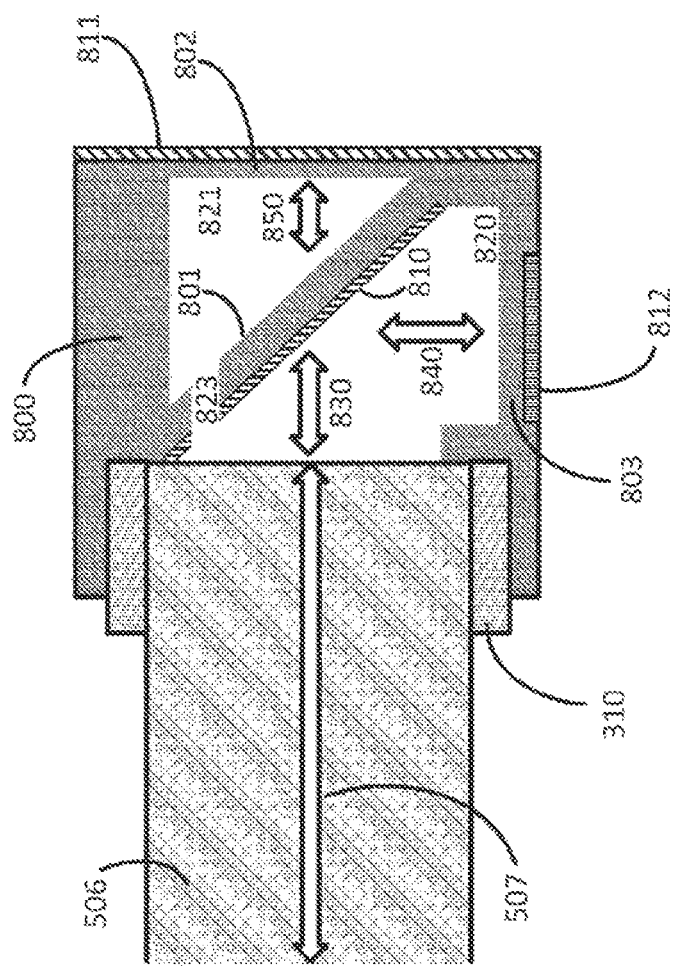

FIG. 8 shows a sensor with diaphragms oriented orthogonally to each other. With the inclusion of a beam-splitter element 801 within the extrinsic structure 800, at least two distinct deformable diaphragms (802 and 803) with corresponding reflective coatings (811 and 812) can be interrogated with the same single-core optical fibre and interferometry setup. A partially reflecting or birefringent coating 810 can be applied prior to fibre integration onto the beam-splitter element to achieve specified beam-splitter performance. Furthermore, two distinct enclosed cavity spaces 820 and 821 can be realised using this design. At least one hole 823 is present in the beam-splitter element along its periphery to remove unprocessed material in the case of additive multi-photon based fabrication; or equivalent in case of subtractive fabrication or micromolding process. The beamsplitter splits light 830 from the optical fibre into reflected 840 and transmitted 850 components and it allows for light to travel in a reciprocal path (as indicated with bidirectional arrows). This sensor can be interrogated with low coherence interferometry, with interference between light reflected from the distal end of the optical fibre and from the diaphragms; provided that the path lengths between light reflected from the distal end of the optical fibre and the diaphragms are sufficiently different (to within the resolution of the system), deflections of the two diaphragms can be differentiated. The diaphragms associated with diaphragm elements 802 and 803 can be designed to provide real-time sensing of directional pressure waves in the front-viewing and side-viewing directions relative to the optical fibre endface. Alternatively, magnetic field measurements in orthogonal directions can be made if magnetic coatings are added to the diaphragms. A second beamsplitter and a diaphragm orthogonal to both diaphragms shown in FIG. 8 could be included in other embodiments.

The figures and previous description relate to preferred features by way of illustration only. It should be noted that from the following discussion, alternative features of the structures and methods disclosed herein will be readily recognized as viable alternatives. The equipment described above is by way of example only, and it will be appreciated that it may be modified in several different ways while remaining within the scope of the present invention. In particular, preferred features that are described with reference to different Figures can be combined together in the same embodiment, unless it is clear that these features are exclusive alternatives to each other.

The invention claimed is:

1. A method for making a housing that defines a cavity for a fibre optic pressure sensor, the method comprising:
providing a bulk of first material that will form the housing;
focusing a radiation beam on internal portions of the bulk of first material so as to modify the internal portions, thereby defining a shape of the housing;
forming a diaphragm by adding a second material different from the first material to the housing such that the housing supports the diaphragm adjacent to the cavity, and such that the diaphragm deflects with changes in pressure external to the sensor; and
discarding either the modified portions or the unmodified portions of the bulk first material so as to form the cavity.

2. The method of claim 1, wherein the focusing step comprises modifying the etching rate of the first material where the radiation is focused, and the discarding comprises etching or developing away the modified or unmodified first material.

3. The method of claim 1, comprising sealing the cavity after the discarding step.

4. The method of claim 1, wherein after the focusing step and before the discarding step, a portion of the diaphragm is deposited onto a region of the bulk of first material that will be discarded to form the cavity, such that said portion of the diaphragm remains adjacent to the cavity after the discarding step.

5. The method of claim 4, in which the diaphragm comprises a reflective surface.

6. The method of claim 1, wherein the shape of the housing is defined such that it comprises an integrally formed optical element that extends across a cross-section of the cavity.

7. The method of claim 6, wherein the optical element is one of a spacer, a lens, a diffraction grating and a beam splitter.

8. The method of claim 7, wherein the optical element is a beam splitter and there are two diaphragm surfaces for receiving radiation respectively along two paths downstream of the beam splitter.

9. The method of claim 1, wherein the shape of the housing is defined to comprise an optical fibre-receiving hole adjacent one end of the cavity.

10. The method of claim 1, wherein the housing comprises a ridge separating the cavity and an optical fibre-receiving hole.

11. The method of claim 1, wherein the shape of the housings defines a plurality of cavities arranged for receiving radiation from a corresponding plurality of cores of a multi-core optical fibre.

12. The method of claim 1, wherein the first material is a glass material.

13. The method of claim 1, wherein the first material is a light-sensitive polymeric material.

14. A method for making a pressure sensor, the method comprising:
   making a housing that defines a cavity for the pressure sensor by the method of claim 1 and
   applying a barrier layer surrounding the housing after attachment to the optical fibre.

15. The method of claim 14, comprising attaching the housing to one end of an optical fibre such that the cavity is adjacent to the end of the optical fibre.

16. A housing that defines a cavity for a pressure sensor, the housing comprising:
   a fibre-receiving hole adjacent one end of the cavity; and
   a diaphragm surface at the opposite end of the cavity such that the diaphragm is adjacent to the cavity, wherein the diaphragm deflects with changes in pressure external to the sensor,
   wherein the cross-sectional area of the cavity increases from the end adjacent to the fibre-receiving hole towards the diaphragm surface,
   wherein a first material defines the cavity and the diaphragm is formed with a second material that is added to first material, the second material being different from the first material.

17. The housing of claim 16, wherein the housing comprises a beam splitter extending across the cavity and there are two diaphragm surfaces for receiving radiation respectively along two paths downstream of the beam splitter.

18. The housing of claim 16, wherein the housing comprises a plurality of cavities arranged for receiving radiation from a corresponding plurality of cores of a multi-core optical fibre.

19. A pressure sensor comprising the housing of claim 16.

20. Use of the pressure sensor of claim 19 for at least one of:
   obtaining a pressure measurement inside a blood vessel;
   obtaining an intracranial pressure; and
   monitoring pressure in an oil well.

21. The method of claim 1, wherein the diaphragm is deposited by a deposition process such as one of chemical vapour deposition, atomic layer deposition, and physical vapour deposition.

22. The method of claim 1, wherein the second material is selected from one of silicon nitride, titanium dioxide, a metal oxide, and a metal.

* * * * *